Patented Feb. 21, 1933

1,898,737

UNITED STATES PATENT OFFICE

SYLVAN R. MERLEY, OF DOVER, NEW JERSEY, ASSIGNOR TO DOHERTY RESEARCH COMPANY, OF NEW YORK, N. Y., A CORPORATION OF DELAWARE

ESTER PURIFICATION

No Drawing.   Application filed June 13, 1928.   Serial No. 285,219.

This invention relates to a process for purifying esters.

In the manufacture of esters on a large scale from petroleum hydrocarbons or from mixtures of alcohols produced from petroleum or other materials the ester fraction corresponding to any individual ester almost always contains small amounts of other esters or other compounds having boiling points near that of the individual ester. Some of these impurities are harmful and some may not be, depending on the purpose for which the ester is to be used. For scientific or other technical purposes, an absolutely pure product is usually required, but in the more usual commercial uses of esters such as solvents in the manufacture of paints, lacquer, cellulose compounds, explosives, toilet preparations and other similar applications, the ultimate purity of the ester is not so important so long as the impurities are not injurious to the product of manufacture or injurious in its use. Where, for example, an ester is used as a solvent in a paint or lacquer and where the pigment may be altered and the final color of the paint changed by some impurity in the ester, such as a small amount of an easily hydrolyzed ester, it is very important that this impurity be removed.

The primary object of the present invention is to purify esters or other similar compounds, of any undesirable constituent or constituents which may prove harmful in the use to which the ester or other compound is put.

In accordance with this object a feature of the invention comprises the treatment of the ester to be purified with a suitable solution of a substance adapted to change or decompose the impurity present in the ester, and subsequently separating the ester from the solution and decomposition products of the impurity.

A further object of the invention is the provision of a process for purifying organic esters of small amounts of less stable esters or other compounds.

In accordance with this object the process of the invention comprises the treating of a quantity of the ester to be purified with a substance or substances adapted to hydrolyze the less stable ester impurity and without substantially affecting the ester being purified, and finally separating the purified ester from the hydrolyzing substance and products of hydrolysis or decomposition.

With these and other objects and advantages in view the process may be best understood from a description of the same in connection with a specific example.

Commercial isopropyl acetate is a well-known solvent having a wide variety of uses in the industries, such as those mentioned above. This ester is produced commercially in various ways, one of which is its production from olefin gases collected from petroleum cracking stills. Isopropyl acetate is usually produced along with other acetates corresponding to the olefins present in the gases, the final separation being made by fractional distillation.

It is evident that where the separation is by fractional distillation (this is the only practical method of separation) that the isopropyl acetate fraction will contain small amounts of other esters which happen to distill near its boiling temperature. Isopropyl acetate distills at a temperature of from 88° to 90° C., so that its fraction may contain for example, small amounts of tertiary butyl acetate which distills at 95° C. Under ordinary conditions where the isopropyl acetate fraction is properly rectified it contains only from a trace to 1 or 2 per cent of tertiary butyl acetate.

In order to free the ester fraction of this small quantity of tertiary ester it is subjected to reflux distillation in the presence of an aqueous solution of acetic acid together with a small amount of sulphuric acid. The refluxing is preferably carried out in batch, in a still equipped with a rectifying or reflux column. In most cases the ester impurity is nearly completely hydrolyzed by the time the refluxing action has started in the column and therefore only a very short time is required to convert the undesired ester into tertiary butyl alcohol and acetic acid. Under certain conditions it may be advisable to further decompose the alcohol by continuing the refluxing until the alcohol has been dehydrated to butylene and this removed or polymerized to di-isobutylene.

The tertiary compounds are much more readily decomposed than the primary and secondary compounds and therefore under this mild treatment the isopropyl acetate will remain substantially unaffected. The presence of acetic acid in the reflux mixture aids in preventing the hydrolysis of the isopropyl acetate.

After the hydrolysis and/or decomposition has been completed the isopropyl acetate is rectified from the aqueous acid material in the still, at the same time water is passed counter-current to the vapors in the column in order to wash down the acetic acid and polymerized impurities. In the presence of water, the isopropyl acetate distills at about 75.5° C., which insures its ready separation from the decomposition products of the impurities. As the acetate distills over with the water vapor and is condensed it separates in a layer on the water, which layer may be decanted off and dried in any approved manner.

When an individual ester or ester fraction, or other similar product has been subjected to the above described process there will be no danger of the presence in the product of any constituent which will decompose when used, or which will have an adverse solvent effect in its use. Furthermore the process provides a convenient method for purifying esters or other similar substances for technical or experimental purposes.

The amount of the sulphuric acid used should not be in excess of about 13% (of 66° Bé. acid) ordinarily about 5% or less will be sufficient.

In the treatment of an isopropyl acetate fraction as described above the various starting materials may be present in the mixture in the reflux still in about the following proportions:

| | Per cent |
|---|---|
| Isopropyl acetate fraction | 80 to 70 |
| Water | 10 to 15 |
| Acetic acid | 5 to 13 |
| Sulphuric acid (66° Bé.) | 5 to 2 |

The length of time to which a particular fraction or product should be subjected to the reflux treatment depends on the relative stability of the impurity in the fraction. In the example given above only a few minutes is necessary to hydrolyze the tertiary ester after the mixture has reached the desired temperature, that is about 76° C. In other cases in order to secure complete decomposition of the impurity it may be necessary to induce secondary decomposition of the first decomposition products or one of them in order to attain the desired equilibrium, as for example, the dehydration of tertiary butyl alcohol to the olefin and its removal as a gas, or its polymerization to di-isobutylene.

If in the process it is desired to hasten the decomposition of the impurity the refluxing may be carried out under a super-atmospheric pressure of from one to five atmospheres; in fact with some compounds containing readily decomposable impurities, the compound may be purified by heating it alone under pressure and thereafter washing out the decomposition products or rectifying the compound from the same.

Where the impurity in any ester fraction or mixture is definitely known its stability with respect to various agents and conditions can be determined or predicted so that the most favorable agents and conditions may be selected. For example, it may be desirable to treat in vapor phase entirely, in which case hydrochloric or other suitable acid may be used. Likewise where the relative difference in stability between the ester fraction and the impurity is not great the refluxing may be conducted under a reduced pressure or vacuum. In most cases, however, where an ester is being treated an acid corresponding to the acid radical of the ester is preferably used along with the decomposing agent, so as to prevent any substantial hydrolysis of the ester.

In the manufacture of mixed esters where some commercial salt, such as calcium acetate, is used, the salt may contain small amounts of calcium formate or other impurities which would, in the ester formation, produce alkyl formates. In such cases the ester or ester-mixture may be purified of these formates by the process of the present invention since they decompose much more readily than acetates or esters of higher acids.

In describing the invention specific reference has been made to the application of the process in treating and purifying esters. It is to be understood, however, that the invention is not limited to the specific example given or specifically to esters, but may be applied to the purification of alcohols by decomposing a relatively unstable alcohol impurity in the manner referred to above wherein tertiary butyl alcohol produced from the hydrolysis of tertiary butyl acetate is dehydrated to butylene which may be removed as such or polymerized to di-isobutylene. Where polymerization is resorted to the undecomposed alcohol being purified may be rectified from the treatment mixture. As an example of alcohols which are difficult to separate by distillation and which may be purified by the process of the present invention mention may be made of isopropyl alcohol boiling at about 82.3° C., containing small amounts of tertiary butyl alcohol boiling at 83° C., and secondary butyl alcohol which boils at 99.4° C. containing as impurity small amounts of tertiary amyl alcohol boiling at 101.8° C. It is to be further understood that the invention is not limited to the purification as carried out in liquid phase but where convenient may be conducted in the gaseous or solid phase with a suitable agent or physical environment.

Having described the invention in its preferred form what is claimed as new is:

1. In the production of esters from olefin gases, the process of purifying a relatively stable organic ester of a carboxylic acid containing an unstable organic impurity, which comprises contacting a quantity of the ester with an aqueous solution of an organic acid corresponding to the acid radical of the ester together with sulfuric acid, subjecting the ester and aqueous solution to reflux distillation in a still provided with a reflux column to decompose said impurity, rectifying the liquid mixture to separate the ester from said solution and decomposed impurity, and introducing water into the upper portion of said column during the rectification of said ester.

2. In the production of organic esters from olefin gases, the process of purifying a relatively stable organic carboxylic acid ester fraction containing a relatively unstable organic carboxylic acid ester impurity, which comprises passing said ester fraction into contact with an aqueous solution of an organic acid corresponding to the acid radical of the ester to be purified and an inorganic acid decomposing agent, heating the ester fraction in contact with the solution to decompose said impurity, and separating the purified ester from the solution and decomposed impurity.

3. In the production of organic esters from olefin gases, the process of decomposing an unstable organic carboxylic acid ester impurity in a relatively stable organic carboxylic acid ester fraction, which comprises contacting said ester fraction with a solution containing an acid corresponding to the acid radical of said ester to be purified and sulphuric acid in a quantity of not more than about 13% of the resulting mixture, subjecting the ester fraction and solution to reflux distillation in a still equipped with a column, thereby to decompose said impurity, and separating the ester from the reflux mixture by rectification.

4. In the production of organic esters from olefin gases, the process of purifying a relatively stable organic carboxylic acid ester containing a relatively unstable carboxylic acid ester impurity, which comprises contacting a quantity of said organic ester with an aqueous solution containing an organic acid corresponding to the acid radical of said ester to be purified and a small percentage of sulfuric acid, said organic acid being about 10% of the resulting mixture, refluxing the ester and solution in a still provided with a reflux column thereby to decompose said impurity, and thereafter separating the purified ester from the solution and decomposed impurity.

5. In the production of organic esters from olefin gases, the process of purifying a relatively stable organic carboxylic acid ester fraction containing a relatively unstable organic impurity, which comprises forming a mixture containing said ester, water, an organic acid corresponding to the acid radical of said ester and an inorganic acid, heating the mixture under a super-atmospheric pressure thereby to decompose said impurity, and separating the ester from the remaining portions of the mixture.

6. In the production of organic compounds from olefin gases, the process of purifying relatively stable alcohols and organic carboxylic acid esters containing a relatively unstable organic impurity of the same class as said compound to be purified, which comprises passing the compound to be purified into intimate contact with an aqueous solution of an aliphatic mono-carboxylic acid and an inorganic acid adapted to decompose said impurity, heating the compound and solution during said contact thereby to decompose said impurity, separating the compound from the solution by rectification, and introducing water into the vapors during said rectification.

7. In the production of organic compounds from olefin gases, the process of purifying relatively stable alcohols and organic carboxylic acid esters containing a relatively unstable organic impurity, which comprises bringing the compound to be purified into contact with a solution comprising an aliphatic monocarboxylic acid and a decomposing agent adapted to decompose said impurity, heating the solution and compound to be purified under a super-atmospheric pressure thereby to effect the decomposition of such impurity, and separating the compound from the resulting solution.

8. In the production of organic esters from olefin gases, the process of purifying a relatively stable organic carboxylic acid ester containing a relatively unstable organic impurity, which comprises forming a mixture comprising said ester, an organic acid corresponding to the acid radical of said ester and not more than 13% of a decomposing agent adapted to decompose said impurity, subjecting the resulting mixture to reflux distillation thereby to decompose the impurity, and separating the purified ester.

9. The process of purifying an isopropyl acetate fraction containing a relatively unstable acetate, which comprises contacting the fraction with an aqueous solution containing acetic acid and sulfuric acid, subjecting the resulting mixture to reflux distillation thereby to decompose said unstable acetate, and distilling the isopropyl acetate from the resulting mixture.

10. In the production of organic esters from olefin gases, the process of decomposing a relatively unstable organic impurity contained in a relatively stable organic carboxylic acid ester fraction, which comprises adding to said fraction a solution containing a reagent adapted to decompose said impurity, heating the ester and impurity under a super-atmospheric pressure thereby to effect said decomposition, and thereafter separately recovering said organic ester.

11. In the production of alcohols and organic esters from olefin gases, the process of effecting the decomposition of relatively unstable alcohol and carboxylic acid ester impurities contained in fractions of relatively stable organic carboxylic acid esters and alcohols, which comprises passing such a fraction into contact with a decomposing agent to decompose said impurity, said agent comprising from 2 to 5% of an inorganic acid, and thereafter separating said compound from the reagent and decomposed impurity by steam distillation.

12. The process of purifying an isopropyl acetate fraction containing a relatively unstable tertiary ester impurity, which comprises heating said fraction in contact with an agent adapted to decompose said impurity, and thereafter separately recovering the purified isopropyl acetate.

13. In the production of organic esters from olefin gases, the process of decomposing a relatively unstable carboxylic acid ester impurity contained in a relatively stable organic carboxylic acid ester fraction, which comprises heating said fraction under a super-atmospheric pressure adapted to decompose said impurity, and separating the ester fraction from the decomposition products of the impurity.

In testimony whereof I affix my signature.

SYLVAN R. MERLEY.